US005780565A

United States Patent [19]
Clough et al.

[11] Patent Number: 5,780,565
[45] Date of Patent: Jul. 14, 1998

[54] SUPERSATMOSPHERIC REACTION

[75] Inventors: Robert S. Clough, Oakdale; Cheryl L. Senger, Woodbury; John E. Gozum, Maplewood, all of Minn.

[73] Assignee: Minnesota Mining and Manufacturing Company, St. Paul, Minn.

[21] Appl. No.: 553,286

[22] PCT Filed: Jul. 7, 1995

[86] PCT No.: PCT/US95/08559

§ 371 Date: Nov. 28, 1995

§ 102(e) Date: Nov. 28, 1995

[87] PCT Pub. No.: WO96/01851

PCT Pub. Date: Jan. 25, 1996

Related U.S. Application Data

[63] Continuation-in-part of Ser. No. 272,779, Jul. 8, 1994, abandoned.

[51] Int. Cl.$^6$ .................................................. C08F 2/00
[52] U.S. Cl. .................... 526/206; 526/942; 526/89; 526/203; 526/318.4; 526/281
[58] Field of Search ................... 526/206, 942, 526/89, 203, 281, 318.4

[56] References Cited

U.S. PATENT DOCUMENTS

| | | | |
|---|---|---|---|
| 3,265,678 | 8/1966 | Hecht | 260/92.1 |
| 3,471,463 | 10/1969 | Kagiya et al. | 260/94.9 |
| 3,522,228 | 7/1970 | Fukui et al. | 260/94.9 |
| 4,250,063 | 2/1981 | Kotani et al. | 260/4 |
| 4,429,666 | 2/1984 | Surace et al. | |
| 4,592,933 | 6/1986 | Meyerson et al. | |
| 4,748,220 | 5/1988 | Hartmann et al. | 526/89 |
| 4,923,936 | 5/1990 | Goodall et al. | 526/115 |
| 4,923,943 | 5/1990 | Hara et al. | 526/283 |
| 4,933,404 | 6/1990 | Beckman et al. | 526/207 |
| 4,943,621 | 7/1990 | Janda et al. | 526/127 |
| 4,945,144 | 7/1990 | Grubbs et al. | 526/268 |
| 4,994,535 | 2/1991 | Endo et al. | 526/259 |
| 5,011,730 | 4/1991 | Tenney et al. | 428/209 |
| 5,162,444 | 11/1992 | Himori | 525/276 |
| 5,296,566 | 3/1994 | Brown-Wensley et al. | 526/171 |
| 5,312,882 | 5/1994 | DeSimone et al. | 526/201 |
| 5,382,623 | 1/1995 | DeSimone et al. | |
| 5,451,633 | 9/1995 | DeSimone et al. | |
| 5,478,905 | 12/1995 | Anolick et al. | |
| 5,506,317 | 4/1996 | DeSimone et al. | |

FOREIGN PATENT DOCUMENTS

| | | |
|---|---|---|
| 1274942 | 10/1990 | Canada. |
| 0 290 195 | 11/1988 | European Pat. Off. |
| 6345824 | 12/1994 | Japan. |
| WO 84/03837 | 10/1984 | WIPO. |
| WO 93/20116 | 10/1993 | WIPO. |
| WO 95/11935 | 5/1995 | WIPO. |
| WO 95/18085 | 7/1995 | WIPO. |

OTHER PUBLICATIONS

F.A. Adamsky and E.J. Beckman, "Inverse Emulsion Polymerization of Acrylamide in Supercritical Carbon Dioxide", *Macromolecules*, vol. 27, pp. 312–314 (1994).

E.J. Beckman and R. D. Smith, "Microemulsion Polymerization Within Near–and Supercritical Continuous Phases: Effect of Microemulsion Structure on Reaction Characteristics", *The Journal of Supercritical Fluids*, vol. 3, pp. 205–213 (1990).

J.M. DeSimone, E.E. Maury, J.R. Combes and Y.Z. Menceloglu, "Heterogeneous Polymerizations in Supercritical Carbon Dioxide Continuous Phases", Proceedings of the American Chemical Society, Division of Polymeric Materials, *Science & Engineering*, vol. 68, pp. 41–42 (Spring 1993).

J.M. DeSimone, E.E. Maury, Y.Z. Menceloglu, J.B. McClain, T.J. Romack and J.R. Combes, "Dispersion Polymerizations in Supercritical Carbon Dioxide", *Science*, vol. 265, pp. 356–359 (15 Jul. 1994).

T. Hoefling, D. Stofesky, M. Reid, E. Beckman, and R. Enick, "The Incorporation of a Fluorinated Ether Functionality into a Polymer or Surfactant To Enhance $CO_2$–Solubility", *The Journal of Supercritical Fluids*, vol. 5, pp. 237–241 (1992).

T.A. Hoefling, D.A. Newman, R.M. Enick and E.J. Beckman, "Effect of Structure on the Cloud–Point Curves of Silicone–Based Amphiphiles in Supercritical Carbon Dioxide", *The Journal of Supercritical Fluids*, vol. 6, pp. 165–171 (1993).

T.A. Hoefling, R.R. Beitle, R.M. Enick and E.J. Beckman, "Design and Synthesis of Highly $CO_2$–Soluble Surfactants and Chelating Agents", *Fluid Phase Equilibria*, 83, pp. 203–212 (1993).

T.A. Hoefling, R.M. Enick and E.J. Beckman, "Microemulsions in Near–Critical and Supercritical $CO_2$", *J. Phys. Chem*, vol. 95, pp. 7127–7129 (1991).

C. Lepilleur, R.M. Enick, and E.J. Beckman, "Dispersion Polymerization in Supercritical Carbon Dioxide," American Institute of Chemical Engineers 1993 Annual Meeting, St. Louis, Missouri, Nov. 7–12, 1993 (Copy of overheads presented also provided).

J.C. Saam, D.J. Gordon and S. Lindsey, "Block Copolymers of Polydimethylsiloxane and Polystyrene", *Macromolecules*, vol. 3, No. 1, pp. 1–4 (Jan.–Feb. 1970).

(List continued on next page.)

*Primary Examiner*—Joseph L. Schofer
*Assistant Examiner*—N. Sarofim
*Attorney, Agent, or Firm*—David G. Burleson; Douglas B. Little; Roger R. Tamte

[57] ABSTRACT

A polymerization process produces polymers that are insoluble in a reaction mixture that was homogeneous before the polymer began to form. A dispersing agent in the polymerizing system (i.e., the reaction mixture plus the dispersing agent) allows a kinetically stable dispersion of the polymer to be formed in this polymerizing system. The polymerization process is performed in a fluid held under superatmospheric conditions such that the fluid is a liquid or a supercritical fluid; the fluid being carbon dioxide, a hydroflurocarbon, a perfluorocarbon, or a mixture of any of the foregoing.

22 Claims, No Drawings

OTHER PUBLICATIONS

D.J. Walbridge, "Polymerization in Non-aqueous Dipersions", *Comprehensive Polymer Science*, vol. 4, pp. 243–260 (1989).

"'Greener' Polymerization Method Uses Supercritical $CO_2$", C&EN, p. 24 (Jul. 18, 1994).

D.A. Armitage, "Organosilanes", *Comprehensive Organometallic Chemistry*, vol. 2, 117–20, Pergamon Press, Oxford (1982).

Kirk–Othmer, *Encyclopedia of Chemical Technology*, (3rd ed.) vol. 8, 597–98 (1979).

G. Odian, *Principles of Polymerization*, 3rd ed., 358–99, Wiley Interscience, New York (1991).

"Cationic Polymerization", *Encyclopedia of Polymer Science –1 & Engineering*, vol. 2, 729–814, H.F. Marks et al., eds., Wiley–Interscience, New York (1985).

Landon et al., "Photoassisted Polymerization of Terminal Alkynes by $W(CO)_6$ Involving Catalyst Generation by an Alkyne to Vinylidene Ligand Rearrangement." *J. Am. Chem. Soc.*, vol. 107, pp. 6739–6740 (1985).

5,780,565

SUPERSATMOSPHERIC REACTION

This is a continuation-in-part application of U.S. Ser. No. 08/272,779, filed Jul. 8, 1994, now abandoned.

BACKGROUND OF THE INVENTION

1. Field of the Invention

This invention describes organic synthesis reactions performed under superatmospheric conditions.

2. Background Information

Dispersion polymerization involves the polymerization of at least one monomer that is soluble in the reaction mixture. Monomer, initiator, and solvent form a homogeneous medium in which polymerization takes place. In this medium, an oligomeric or polymeric radical grows until it attains such a high molecular weight that it is no longer soluble in the reaction mixture. At this point, the polymer phase separates into particles. A stabilizer or dispersing agent prevents particle aggregation or flocculation, i.e., a kinetically stable dispersion is formed.

Dispersion polymerization differs from emulsion, microemulsion, and suspension polymerization in that the starting monomers are soluble in the polymerization solvent or diluent and do not require emulsification (i.e., the formation of monomer-containing micelles or droplets). Further, unlike emulsion polymerization, the overall rate of polymer propagation in dispersion polymerization is not dependent on particle number. (All of these differ from solution polymerizations where all materials remain soluble in the polymerization medium throughout the course of the polymerization and from precipitation polymerization where the polymer product precipitates from the polymerization medium and aggregates.)

Dispersion polymerizations can be carried out in aqueous or non-aqueous media. Non-aqueous (usually organic) dispersion polymerizations were developed in an effort to provide thin films of vinyl or acrylic polymers without having to resort to multiple applications of dilute polymer solutions. Although this goal was accomplished, the continued use of volatile organic compounds (VOCs) remains a significant problem. Coating VOC-dispersed polymers, while an improvement over solution polymerization, does not eliminate the problem of disposing of the organic medium itself.

Dispersion polymerizations performed in non-aqueous diluents can produce monodisperse particles with diameters ranging from 80 nm to 10 µm. These particles, once separated from the reaction medium, have potential use as, for instance, chromatography packing materials and controlled-release matrices.

In dispersion polymerizations performed in organic diluents, suppression of flocculation through the use of a polymeric stabilizer (i.e., dispersing agent) is known as steric stabilization. Traditional stabilizers have distinct segments, one segment being soluble in and the other incompatible with the polymerization medium. The incompatible segment sorbs onto the surface of the polymer particle to be dispersed, while the soluble segment forms a sheath around the polymer particle to be dispersed. Typically, such stabilizers have been block or graft copolymers.

Olefin metathesis reactions are generally carried out neat (i.e., without solvent). Because metathesis catalysts are often organometallic complexes, insolubility of the catalyst can be a problem. This can lead to incomplete conversion of the olefins undergoing the metathesis reaction.

The use of supercritical fluids or liquids that are gases at standard temperature and pressure (STP, 25° C. and 1 atm) as reaction fluids has been studied. In particular, carbon dioxide, either as a liquid or as a supercritical fluid, has been reported as a polymerization medium. Solution polymerizations (PCT Publication WO 93/20116), suspension and emulsion polymerizations (U.S. Pat. No. 5,312,882), microemulsion polymerizations (U.S. Pat. No. 4,933,404) and precipitation polymerizations (U.S. Pat. No. 3,471,463) have been described previously. Dispersion polymerization in superatmospheric fluids has not been taught or suggested heretofore.

SUMMARY OF THE INVENION

Briefly, the present invention provides a process of making a polymer, comprising the steps of:

a) providing a polymerizing system comprising 1) a homogeneous reaction mixture comprising at least one fluid that is a gas at STP and that is held at a pressure greater than atmospheric pressure such that the fluid is a liquid or a supercritical fluid, one or more monomer(s) that polymerize by chain polymerization, and an effective amount of a polymerization initiator and/or catalyst; and 2) a dispersing agent for a polymer formed from the monomer(s) in the polymerizing system; and b) allowing the monomer(s) to polymerize to form the polymer, which is insoluble in the reaction mixture, wherein the dispersing agent allows a kinetically stable dispersion of the polymer to be formed in the polymerizing system.

In another aspect, the present invention provides a method of performing an olefin metathesis reaction comprising the steps of (1) providing a composition comprising at least one fluid that is a gas at STP and that is held at a pressure greater than atmospheric pressure such that the fluid is a liquid or a supercritical fluid, at least one olefin capable of undergoing metathesis, and a compound comprising a transition metal which is capable of facilitating olefin metathesis, (2) allowing the transition metal-containing compound to initiate the metathesis of the olefin(s), and, optionally, (3) isolating the product of the metathesis reaction.

In yet another aspect, the present invention provides a kinetically stable dispersion comprising (a) at least one fluid that is a gas at STP and that is held at a pressure greater than atmospheric pressure such that the fluid is a liquid or a supercritical fluid, (b) a polymer, and (c) a dispersing agent for the polymer, the polymer being formed from one or more monomer(s) that polymerize by chain polymerization.

In a final aspect the present invention provides a composition comprising at least one fluid that is a gas at STP and that is held at a pressure greater than one olefin that is capable of metathesis, and a transition metal-containing catalyst, and, optionally, the product of the olefin metathesis reaction.

While most olefins are capable of undergoing metathesis, certain olefins metathesize only with difficulty. For example, olefins with bulky groups (e.g., t-butyl) on both sides of a double bond (i.e., olefins that are sterically hindered) have difficulty in approaching the transition metal atom of the catalyst in such a way so as to allow them to metathesize. Some groups might be so bulky so as to actually prevent the metathesis of the olefins to which they are attached.

The methods of the present invention have the distinct advantage that certain fluids that are gases at STP, particularly $CO_2$, can be used as the reaction fluid. Carbon dioxide is non-toxic and non-polluting, both of which are significant advantages. This can eliminate VOCs and hazardous organic solvents from the polymerization and metathesis processes. Also, the products of the processes of the present invention can be separated from the reaction fluid merely by depressurizing the reaction vessel. This can allow the resultant products to be essentially free of residual reaction fluid.

The following definitions apply in this application, unless otherwise indicated:

"hydrofluorocarbons" means gases of the general formula $C_aH_bF_c$ where b+c=2a+2, that can be easily liquified under pressure;

"(meth)acrylate" means acrylate and methacrylate;

"(meth)acrylic" means acrylic and methacrylic;

"chain polymerization" means addition (including free radical, coordination, anionic, and cationic), ring opening, and olefin metathesis polymerizations;

"olefin metathesis" means the reaction of one or more olefins around a transition metal atom in which cleavage and reformation of carbon-to-carbon double bonds, without migration or exchange of protons, occurs (see also Kirk-Othmer, *Encyclopedia of Chemical Technology* (3d ed.), 8, 597–98 (1979)); and "monomer" or "polymer" or "group" means a chemical species that allows for substitution by conventional substituents that do not interfere with the desired product.

DETAILED DESCRIPTION OF PREFERRED EMBODIMENTS

Typically, polymerization or reaction temperatures can range from −78° to 400° C., preferably from 0° to 300° C., most preferably 15° to 150° C., and pressures can range from 102 kPa to 690 MPa (approximately 0.15 to 100,000 psig), preferably 102 kPa to 400 MPa (approximately 0.15 to 60,000 psig), more preferably 102 kPa to 140 MPa (approximately 0.15 to 20,000 psig), most preferably 790 kPa to 100 MPa (approximately 100 to 15,000 psig). Particular ranges within these broad ranges will be effective for various reaction media. Varying temperature and/or pressure will affect the properties of the resultant product, and those skilled in the art will recognize how to optimize conditions for a given system. Because the reaction conditions can be quite extreme, the reactions are normally carried out in high pressure reactor, although other devices can prove useful depending on a particular set of reaction conditions.

The reactions of the present invention are normally performed in an agitated stainless steel reactor, optionally equipped with high pressure windows (e.g. sapphire) for observation of cell contents and an additional pressure handling system for the addition of various materials under supercritical conditions. The reactor can operate in a batch, a semi-batch (e.g., separate nucleation and growth steps), or a continuous mode. The reactor can be equipped with heating and/or cooling elements. If desired, the temperature can be monitored by a thermocouple type device that can be connected to a temperature controller, which optionally can be microprocessor controlled. The reactor also is capable of being fitted with a microprocessor process control unit. If desired, the reactor can be equipped with a venting mechanism to release pressure, or, optionally, spray product out of the reactor. An outlet pipe can be attached to transport product to another location.

For the sake of clarity, the dispersion polymerization of the present invention will be described first, followed by a complete description of the olefin metathesis reaction of the present invention.

A. Dispersion Polymerization

The dispersion polymerization of the present invention can be carried out at any temperature and pressure at which the reaction mixture (i.e., the fluid, the monomer(s), and an effective amount of the initiator or catalyst) is homogeneous. The conditions can be manipulated to ensure that, at the outset of polymerization, the reaction mixture is homogeneous. This can include heating the initially-charged starting materials and/or increasing the reaction pressure to aid in solubilizing the starting materials prior to initiation of polymerization. Typical polymerization temperatures range from −78° to 250° C., preferably from 15° to 200° C.

Free radical polymerizations are often initiated thermally. Where the process of the present invention involves a thermally initiated polymerization, the reaction fluid, monomer(s), and an effective amount of the initiator must be in solution at some temperature below the effective decomposition temperature of the initiator. The reaction can also be photoinitated, in which case this thermal limitation is inapplicable.

Any material that is a gas at STP but can be transformed to a liquid or a supercritical fluid under increased (i.e., superatmospheric) pressure can be used as the reaction fluid in the method of the present invention. The reaction fluid preferably is one that is not harmful to the atmosphere and is non-toxic towards humans, animals, and plants when vented or released. Preferred fluids include $CO_2$, hydrofluorocarbons (HFCs) and perfluorocarbons (e.g., perfluoropropane and perfluorocyclobutane) that are gases at STP, hydrocarbons that are gases at STP, polyatomic gases, noble gases, and mixtures thereof. Useful polyatomic gases include $SF_6$, $NH_3$, $N_2O$, and CO. Most preferred reaction fluids include $CO_2$, HFCs, perfluorocarbons, and mixtures thereof. Examples of useful HFCs include those that are known to be good solvents for many small organic compounds, especially those HFCs that comprise from 1 to 5 carbon atoms. Specific examples include 1,1,2,2-tetrafluoroethane, 1,1,1, 2-tetrafluoroethane, trifluoromethane, and 1,1,1,2,3,3,3-heptafluoropropane. Compatible mixtures of any two or more of the foregoing also can be used as the reaction fluid.

Monomers that polymerize by chain polymerization can be useful in the method of the present invention. Preferred among these are those free radically-polymerizable ethylenically-unsaturated monomers that can be made soluble in the reaction fluid prior to polymerization. These include, but are not limited to, (meth)acrylic acid and its derivatives. One such category of derivatives is alkyl (meth) acrylates, i.e., alkyl esters of (meth)acrylic acid. Although almost any alkyl group can be included in the ester moiety, preferred alkyl groups comprise from 1 to 20 carbon atoms. This group can be a straight chain, branched, or cyclic. Examples of useful alkyl (meth)acrylates include hexyl (meth)acrylate, isooctyl acrylate (IOA), 2-ethylhexyl acrylate, isononyl (meth)acrylate, isobornyl (meth)acrylate, phenoxyethyl acrylate, decyl (meth)acrylate, dodecyl (meth) acrylate, methyl (meth)acrylate, ethyl (meth)acrylate, n-propyl (meth)acrylate, n-butyl (meth)acrylate, n-octyl (meth)acrylate, isobutyl (meth)acrylate, cyclohexyl (meth) acrylate, octadecyl (meth)acrylate, and t-butyl (meth) acrylate.

In addition to alkyl esters, other useful (meth)acrylic acid derivatives include (1) hydroxyalkyl (meth)acrylates, i.e., (meth)acrylic acid monoesters of polyhydroxy alkyl alcohols (such as 1,2-ethanediol, 1,2-propanediol, and 1,3-propanediol), various butyl diols, various hexanediols, glycerol, and other alkyl triols; (2) poly(meth)acrylates such as 1,4-butanediol diacrylate, 1,6-hexanediol diacrylate, glycerol di- or triacrylate, neopentyl glycol diacrylate and related di- and tri-(meth)acrylates; (3) macromeric (meth) acrylates such as (meth)acrylate-terminated styrene oligomers and (meth)acrylate-terminated polyethers, the latter of which is more fully described in PCT Publication WO 84/03837; and (4) nitrogen derivatives of (meth)acrylates such as (meth)acrylonitrile, (meth)acrylamide, N-substituted (meth)acrylamides, N,N-disubstituted (meth) acrylamides (including substituents of 5- and 6-membered heterocyclic rings comprising one or more heteroatoms).

Other useful free radically-polymerizable ethylenically-unsaturated monomers include methyl-substituted maleonitrile; ethylene and propylene; N-vinyl lactams such as N-vinylpyrrolidone and N-vinylcaprolactam; vinyl esters of carboxylic acids, such as vinyl acetate, vinyl propionate, vinyl decanoate, vinyl pentanoate, and related vinyl esters of $C_1$–$C_{20}$ branched or straight-chain substituted or unsubstituted carboxylic acids; vinyl halides and vinylidene halides, such as vinyl chloride, vinylidene fluoride, tetrafluoroethylene, hexafluoropropylene, chlorotrifluoroethylene, and related halogenated species; vinyl ethers such as methyl vinyl ether, butyl vinyl ether, and related compounds as well as their halogenated derivatives; cyclic ethylenically-unsaturated carboxylic acid anhydrides such as maleic anhydride; and unsubstituted and ring-substituted styrenes such as styrene, α-methyl styrene, vinyl toluene, and divinyl benzene.

Cationic polymerizations that proceed by chain polymerization have been described in, for example, "Cationic Polymerization," *Encyclopedia of Polymer Science and Engineering*, vol. 2, 729–814, H. F. Mark et al., eds., Wiley-Interscience, New York (1985) and G. Odian, *Principles of Polymerization*, 3rd ed., 358–98, Wiley-Interscience, New York (1991). Monomers that polymerize cationically that can be used in the present invention include:

(A) aromatic alkenes such as (1) compounds having an exocyclic carbon-carbon double bond adjacent to the aromatic ring, such as styrene, a-methyl styrene, 1,1-diphenylethylene, 1-phenylpropene, and ring-substituted analogs (especially those with electron-donating ring substituents which can enhance the reactivity of these species toward polymerization) and (2) other aromatic alkene species such as indene, acenaphthylene, and 2-alkenyl furans;

(B) conjugated dienes and trienes, whether open-chain or cyclic, such as cyclopentadiene, isoprene, and butadiene;

(C) unconjugated dienes and polyenes, including open-chain dienes such as 2,5-dimethyl-1,5-hexadiene, norbornadiene, and related bicyclic compounds;

(D) 1,1-dialkyl substituted alkenes including straight-chain alkenes such as isobutylene (although large alkyl substitution on the double bond can lead to steric inhibition of polymerization) and those alkenes wherein the substitution constitutes an alicylic ring (so-called methylenecyclo compounds) including, for example, beta-pinene, various 2-metheno bicyclo[2.2.1]heptanes, methylenecyclopentane, and methylenecyclobutane;

(E) vinyl ethers and sulfides of the general formula $CH_2=CHGR^1$ wherein G is oxygen or sulfur, $R^1$ is (1) a branched or linear alkyl group having from 1 to about 20 carbon atoms or (2) an aralkyl group of the formula $R^2$—Ar wherein $R^2$ is a linear or branched alkyl group having from 1 to about 20 carbon atoms and Ar is an aromatic group having from 6 to about 20 carbon atoms, a halo-substituted alkyl or aralkyl group, 1,2-dimethoxyethylene, 2,3-dihydrofuran, 2-methylenetetrahydrofuran, and mixtures thereof;

(F) N-vinylamines of the general formula $CH_2=CH-N(R^3)_2$, wherein each $R^3$ is independently H or a branched or linear alkyl group having from 1 to about 20 carbon atoms or wherein both $R^3$ groups together constitute an aromatic ring, such as in N-vinylcarbazole, N-vinylpyrrole, and N-vinylbenzopyrrole; and (G) heterocyclic compounds (i.e., those containing one or more oxygen, sulfur, nitrogen or phosphorous atoms) such as epoxides, tetrahydrofuiran, 1,3-dioxolane, lactones such as ε-caprolactone, N-t-butylaziridine, azetidines, lactams, tetrahydrothiophene, substituted thioepoxides and thiacyclobutanes, cyclic esters of phosphoric acid, 2-alkoxy-1,3,2-dioxaphospholanes, and mixtures thereof Ring-strained non-conjugated cyclic olefins (i.e., ring opening metathesis polymerizable or "ROMP" compositions) are also useful as monomers in the method of the present invention. The cyclic olefin metathesis that these ring-strained non-conjugated cyclic olefins undergo can be summarized as follows:

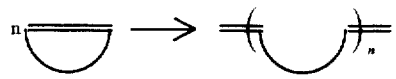

wherein

is a non-conjugated cyclic olefin monomer and

is a ring-opened polymerized unit with the same degree of unsaturation as the monomer from which it came, with n being from 5 to 50,000.

Ring-strained non-conjugated cyclic olefins useful in the present invention are those described in U.S. Pat. No. 5,296,566, which is incorporated herein by reference, and include monocyclic mono- and diolefins and polycyclic mono- and diolefins. These cyclic olefins can be substituted with up to four saturated or unsaturated hydrocarbyl, alkaryl, aralkyl, or aryl groups, in which "alkyl" or "alk" or "hydrocarbyl" can be linear, branched or cyclic, each group containing up to 30 carbon atoms, up to sixty halogen atoms, and up to four heteroatoms selected from non-peroxidic O, N, and Si, which can be combined to form functional groups or linkages including ethers, alcohols, alkoxies, ketones, aldehydes, carboxylic acids, esters, amides, imides, amines, cyanides, anhydrides, organosilicons, organosilicones, oxysilanes, alkoxysilanes, and the like.

Preferred monocyclic monoolefins include substituted and unsubstituted cyclopropene, cyclobutene, cyclopentene, cycloheptene and cyclooctene. Preferred polycyclic monoolefins include substituted and unsubstituted norbornene and bicyclo[2.2.2]-oct-2-ene. Preferred polycyclic polyolefins include substituted and unsubstituted norbornadiene and dicyclopentadiene. In the cases of substituted norbornene and dicyclopentadiene, endo/exo, syn/anti, or combinations of any of these isomers are suitable. Other examples of suitable monomers include 5-methyl-2-norbornene, 5-ethyl-2-norbornene, 7-methyl-2-norbornene, 1-methyl-2-norbornene, 5-hexyl-2-norbornene, 5-octyl-2-norbornene, 5,6-dimethyl-2-norbornene, 5-norbornene-2- carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol-5-norbornen-2-ol, 2-acetyl-5-norbornene, 5-norbomen-2-yl acetate, 2-benzoyl-5-norbornene, 5-vinyl-2-norbornene, 5-methylene-2-norbornene, 5-norbornene-2-methanol acrylate, 5-|2-(trimethylsilyl)ethyl|-2-norbornene, 5-|2-(pentamethyl-disiloxyl)ethyl|-2-norbornene, 5-chloromethyl-2-norbornene, 2,3-di(chloromethyl)-5-norbornene, 5-trifluoromethyl-2-norbornene, and 2,3,3-trifluoro-2-trifluoromethyl-5-norbornene. Other suitable monomers are described in U.S. Pat. Nos. 5,011,730, 4,994,535, 4,945,144, 4,943,621, 4,923,943, 4,923,936, and 4,250,063. All these materials are commercially available (e.g., Aldrich Chemical Co.; Milwaukee, Wis.) or can be prepared as described in the chemical literature, with the possible exception of 5-|2-(trimethylsilyl)ethyl|-2-norbornene and 5-|2-(pentamethyldisiloxy)ethyl|-2-norbornene which are prepared by the reaction of 5-vinyl-2-norbornene with trimethylsilane or pentamethyldisiloxane, respectively, in the presence of platinum-containing catalysts using published procedures for the hydrosilation of alkenes (see, e.g., D. A. Armitage, "Organosilanes", *Comprehensive Organometallic Chemistry*, vol. 2, 117–20, Pergamon Press, Oxford (1982)). Preferably, at least one of the cyclic olefins of the present invention is polycyclic, specifically substituted or unsubstituted norbornene or substituted or unsubstituted dicyclopentadiene.

Monomers that polymerize anionically that are useful in the present invention include epoxies, cyclic amides, isoprene, styrene, vinyl toluene, butadiene, halogenated dienes, the above-mentioned (meth)acrylates, and hexamethylcyclo(trisiloxane).

Monomers that undergo coordination polymerization include, for example, α-olefins, particularly $C_2$ to $C_{20}$ α-olefins.

While all the monomer(s) will be soluble in the reaction mixture, only an effective amount of the polymerization initiators or catalysts need be soluble in the reaction mixture under the previously described polymerization conditions.

Polymerization of free radically-polymerizable ethylenically-unsaturated monomers is typically initiated by an energy-activated initiator. This energy can be either heat or light. Where the energy is heat, the initiator preferably has a decomposition temperature of at least 15° C.

Common thermal initiators useful in the present invention where the monomer is a free radically-polymerizable ethylenically-unsaturated compound include azo compounds, such as 2,2'-azobis(methoxy-2,4-dimethylvaleronitrile), 2,2'-azobis(2,4-dimethylvaleronitrile), t-butylazo-2-cyanobutane, and 2,2'-azobis(isobutyronitrile); hydroperoxides, such as cumene hydroperoxide and t-butyl hydroperoxide; peroxides such as dibenzoyl peroxide, dioctanoyl peroxide, dilauryl peroxide, bis(t-butylperoxy)cyclohexane, dicumyl peroxide, di(t-amyl) peroxide, and di(t-butyl) peroxide; peroxyesters, such as t-butyl perneodecanoate, t-butyl perpivalate, t-butyl per-2-ethylhexanoate, t-butyl permaleate, and t-butyl peracetate; peroxydicarbonates such as di-t-butyl peroxydicarbonate, di(t-butylcyclohexyl) peroxydicarbonate, diacetyl peroxydicarbonate, and di(2-ethylhexyl) peroxydicarbonate; and disulfides such as thiuram disulfide.

Common photoinitiators useful where the monomer is a free radically-polymerizable ethylenically-unsaturated compound include benzoin ethers such as benzoin methyl ether and benzoin isopropyl ether; substituted benzoin ethers such as anisoin methyl ether, anisoin ethyl ether, and anisoin isopropyl ether; substituted acyloin ethers such as α-hydroxymethyl benzoin ethyl ether; substituted acetophenones such as 2,2-diethoxyacetophenone and 2,2-dimethoxy-2-phenylacetophenone; benzophenone and substituted benzophenones such as Michler's ketone, 4,4'-tetramethyldiaminobenzophenone; substituted a-ketols such as 2-methyl-2-hydroxypropriophenone and 1-hydroxycyclohexyl phenyl ketone; aromatic sulfonyl chlorides such as 2-naphthalene-sulfonyl chloride; photoactive oximes such as 1-phenyl-1,1 -propanedione-2-(O-ethoxy-carbonyl)oxime; disulfides such as thiuram disulfide and diphenyl disulfide; and thio- and dithiocarbamates.

Where the monomer is one that polymerizes cationically, useful initiators and/or catalysts include those known in the art. Common examples include protic acids and Lewis acids such as, for example, metal halides (e.g., $AlCl_3$, $BF_3$, $SnCl_4$, $TiCl_4$, etc.); organometallic compounds such as $RAlCl_2$, $R_2AlCl$, and $R_3Al$ wherein R is an alkyl group, preferably a $C_1$ to $C_{20}$ alkyl group; and oxyhalides, such as $POCl_3$ and $CrO_2Cl$.

Where the monomer is a ring-strained non-conjugated cyclic olefin, useful catalysts include Periodic Groups 4–10 transition metal compounds and complexes, particularly those that comprise at least one of Mo, W, Ru, Os, Ti, Re, and Ir. Cocatalysts can be used in combination with certain transition metal-containing species. Traditional catalysts have called for a compound having one or more alkyl group bonded to a non-transition metal (i.e., those from Periodic Groups 1–2 and 12–14), although more recent catalysts can be used with Lewis acids, oxidizing agents, silanes, heteroatom-containing olefins, and alkynes. Although well known air- and water-sensitive catalysts can be used, those that are air and moisture stable are preferred. One- and two-part catalysts that are air and moisture stable are more fully described in the Background, Summary, and Detailed Description sections of the previously-incorporated U.S. Pat. No. 5,296,566. Particularly preferred catalysts include $|(L)_2IrCl|_2$ where L is an olefin or a Lewis base donor, $(NBD)Mo(CO)_4$ where NBD is norbornadiene, $(NBD)W(CO)_4$, $Mo(CO)_6$, and $W(CO)_6$, optionally in combination with a Lewis acid, oxidizing agent, etc., listed above.

Where the monomer is one that polymerizes anionically, useful initiators and/or catalysts include alkyl and aryl lithium compounds (e.g., n-BuLi), sodium naphthalide and metal amides, among others.

Where the monomer undergoes coordination polymerization, useful catalysts include metallocenes and Ziegler-Natta systems, which are well known in the art.

Because the polymer produced by the method of the present invention is insoluble in the reaction mixture, a dispersing agent (i.e., stabilizer) is necessary to disperse it. However, the dispersing agent need not be present in the initial reaction mixture. It can be introduced just prior to the onset of polymerization, or even later in the course of the reaction, as long as it is present when the polymer begins to become insoluble in the reaction mixture (i.e., requires stabilization).

Two types of dispersing agents can be used in the present invention: polymerizable (i.e., internal or reactive) and non-polymerizable (i.e., external). External dispersing agents are those compounds that must be added as a separate component to the reaction mixture (i.e., are not polymerizable with the monomer(s)). Internal stabilizers are reactive species that can be incorporated in the resulting polymer, (i.e., polymerizable with the monomer(s)).

Internal dispersing agents that are useful in the present invention include fluoromonomers such as 1,1-dihydroperfluorooctyl acrylate (FOA), 1,1-dihydroperfluorooctyl methacrylate (FOMA), 2-(N-ethyl perfluorooctanesulfonamido)ethyl (meth)acrylate (EtFOSE (m)A), and 2-(N-methyl perfluorooctanesulfonamido)ethyl (meth)acrylate (MeFOSE(m)A); fluoromacromers (i.e., a fluoromonomer, such as FOA or FOMA, that has been polymerized to a low molecular weight and is endcapped by or converted to, for instance, an acrylate- or vinyl-functional moiety); silicone monomers such as acrylate-terminated siloxanes (e.g., 3-methacryloxypropyltris(trimethylsiloxy) silane); and silicone macromers (i.e., a silicone monomer that has been polymerized to a low molecular weight and is endcapped by or converted to, for instance, an acrylate-, acrylamide- or vinyl-functional moiety) with a repeating unit of $(OSiR^4R^5)$, e.g.,

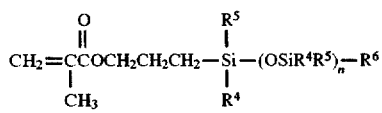

wherein n is 1 to 1000, preferably 1 to 100, $R^4$ and $R^5$ are independently H, an alkyl group, or an aryl group, and $R^6$ is an alkyl group.

External dispersing agents useful in the method of the present invention include fluoropolymers such as poly (FOA) and poly(FOMA); fluorinated ether compositions including poly(fluorinated ethers); any commercially available poly(siloxanes), such as poly(dimethylsiloxane); block copolymers wherein at least one block is a fluoropolymer (e.g., poly(FOA-b-IOA)) or at least one block is a silicone polymer (see, e.g., *Macromolecules*, 3(1), 1–4 (1970)); random copolymers of at least one fluoromonomer or silicone monomer, such as 90:10 poly(FOA-co-IOA); and silicone- or fluorine-containing graft copolymers wherein (1) a monomer that forms a polymeric backbone insoluble in the reaction mixture of the dispersion polymerization (e.g., any non-fluorinated or non-silicone polymer such as polystyrene, poly(meth)acrylates, poly(meth)acrylamides, etc.) is copolymerized with a silicone- or fluoro-monomer, (2) an oligomer or polymer having at least one Si—H functionality is reacted with, for example, a hydrocarbon-backbone polymer bearing vinyl groups to produce an insoluble-backbone polymer with soluble siloxane grafts, or (3) a fluoromacromer or silicone macromer is copolymerized with a monomer, the homopolymer of which is insoluble in the reaction mixture.

Any common solvent that is soluble in the reaction mixture can act as a co-solvent in the method of the present invention. Typical examples include tetrahydrofuran, alcohols, liquid alkanes, methylene chloride, chloroform, toluene, water, ketones, and esters. One or more co-solvents can be used to aid in the solubilization of one or more components in the initial reaction mixture. The amount of co-solvent must be kept below the point where the subsequent polymerization can be classified as a solution polymerization.

If desired, one or more of a variety of adjuvants can be added to the reaction mixture. An example of a particularly useful class of adjuvants is crosslinking agents, which enhance the cohesive strength of the resulting polymer. Typical crosslinking agents include multifunctional acrylates, especially those selected from the group consisting of $C_1$–$C_8$ alkyl di- and tri-acrylates including, for example, 1,4-butanediol diacrylate, 1,6-hexanediol diacrylate, 1,8-octanediol diacrylate, neopentyl glycol diacrylate, glycerol diacrylate, and trimethylolpropane triacrylate; bisamides such as methylene-bisacrylamide and N,N'-bis-1,2-propyleneterephthalamide; divinylbenzene; ring-strained polyolefins such as dicyclopentadiene, norbornadiene, and linked (optionally substituted) norbornenes, dicyclopentadienes, and norbornadienes; aldehydes such as benzaldehyde and acetaldehyde; anthroquinone, substituted anthraquinones, and various benzophenone-type compounds including, for example, acryloxybenzophenone; various peroxides or other polymerization initiators that work via hydrogen extraction (e.g., hydrogen peroxide); and certain chromophore-substituted vinyl halomethyl-s-triazines such as 2,4-bis (trichloromethyl)-6-p-methoxystryl-s-triazine.

Other useful adjuvants include, but are not limited to, chain transfer agents such as tetrabromomethane, 2-mercaptoethanol, mercaptopropanols, mercaptobutanols, thioglycolic acid, N-dodecylmercaptan, t-dodecylmercaptan, thiophenol, mercaptopropionic acid, allyl alcohol, and acetaldehyde; inhibitors of thermal and/or UV degradation such as hindered phenols, benzophenones, cyanoacrylate esters, copolymerizable UV absorbers, and the like; colorants, dyes and pigments; flame retardants; antistatic agents; fillers, such as titania, silica, and solid or hollow glass or resin microspheres; and coupling agents such as silanes. Another class of potentially useful adjuvants are alcohols and polyols, which can be used as chain extenders, crosslinking agents, and chain transfer agents in the cationic polymerization of heterocyclic compounds, especially epoxides.

Polymers prepared according to the process of the present invention can be used as, for instance, adhesives, vibration damping materials, molding compounds, coating materials, and chromatographic packings. Articles comprising a layer of such a polymer coated on at least one surface of a substrate are also within the scope of the present invention. Such articles can be pressure sensitive adhesives, tapes, release liners, protective materials or coatings, and antiblocking or antifriction materials.

B. Olefin Metathesis

The olefin metathesis reaction of the present invention can involve one or more ethylenically unsaturated alkyl, cycloalkyl, arylalkyl, or cycloalkylaryl compounds. Where only one compound is involved in a metathesis reaction, it typically is a ring-strained cyclic olefin.

At least five general types of metathesis reactions are possible. These include (1) a straight exchange between olefinic compounds,

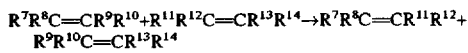

(2) ring-opening metathesis polymerizations (with dispersion-type polymerizations described in detail above, while emulsion, suspension, solution, and precipitation polymerizations being capable of being performed according to processes known n the art), (3) depolymerization of unsaturated polymers,

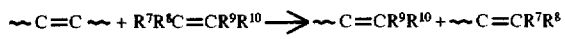
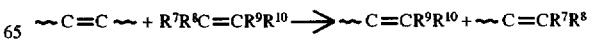

(4) crosslinking reactions such as, for example,

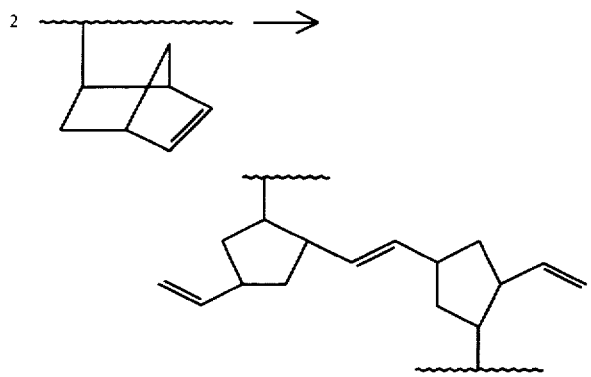

and (5) decrosslinking reactions such as, for example,

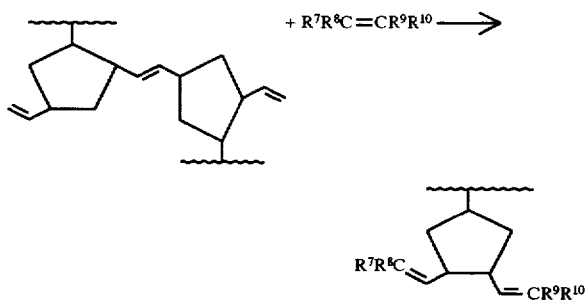

wherein $R^7$, $R^8$, $R^9$, and $R^{10}$ can be the same or different and are independently saturated or unsaturated hydrocarbyl, alkaryl, aralkyl, or aryl groups, in which "alkyl" or "alk" or "hydrocarbyl" can be linear, branched or cyclic, each group containing up to 30 carbon atoms, up to sixty halogen atoms, and up to four heteroatoms selected from non-peroxidic O, N, and Si, which can be combined to form functional groups or linkages including ethers, alcohols, alkoxies, ketones, aldehydes, carboxylic acids, esters, amides, imides, amines, cyanides, anhydrides, organosilicons, organosilicones, oxysilanes, alkoxysilanes, and the-like.

The metathesis reaction of the present invention is catalyzed by a compound comprising a transition metal. The transition metal is often Mo, W, Ir, Ru, or Re, although most of the transition metals have been shown to be catalytically active with respect to metathesis reactions.

Common ligands that can be bound to the transition metal can be provided by monodentate and polydentate compounds (preferably containing up to about 60 carbon atoms and up to 10 hetero atoms selected from nitrogen, sulfur, non-peroxidic oxygen, phosphorus, arsenic, selenium, antimony, and tellurium).

Examples of suitable monodentate compounds or groups are carbon sulfide, carbon selenide, carbon telluride, alcohols such as ethanol, butanol, and phenol; ethers such as tetrahydrofuran; compounds of Group VA elements such as ammonia, phosphine, trimethylamine, trimethylphosphine, triphenylamine, triphenylphosphine, triphenylstilbine, triphenylarsine, tributylphosphite; isonitriles such as phenylisonitrile, butylisonitrile; olefinic compounds such as ethylene, acetylene, propylene, methylacetylene, 1-butene, 2-butene, diacetylene, 1,2-dimethylacetylene, cyclobutene, pentene, norbornene, cyclopentene, hexene, cyclohexene, cycloheptene, 1-octene, 4-octene, 3,4-dimethyl-3-hexene, 1-decene, and 1-dodecene.

Examples of suitable polydentate compounds or groups include 1,2-bis(diphenylphosphino)ethane, 1,2-bis (diphenylarsino)ethane, bis(diphenylphosphino)methane, ethylenediamine, propylenediamine, diethylenetriamine, hydridotripyrrazolyborate, butadiene, norbornadiene, 1,3-cyclohexadiene, cyclopentadiene, and 1,4-cyclohexadiene.

Further examples of useful ligands include substituted and unsubstituted cycloheptatriene, cyclooctatetraene, benzene, toluene, xylenes, mesitylene, hexamethylbenzene, fluorene, naphthalene, anthracene, perylene, chrysene, pyrene, triphenylmethane and carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin.

The ligands can be a unit of a polymer, for example the coordinating amino group in poly(ethyleneamnine); the coordinating phosphino group in poly(4-vinylphenyldiphenylphosphine); the coordinating isonitrile group in poly(4-vinylphenylisonitrile); the phenyl group in polystyrene, poly(styrene-co-butadiene), poly(styrene-co-methyl methacrylate), poly($\alpha$-methylstyrene), polyvinylcarbazole, and polymethylphenylsiloxane; and the cyclopentadiene group in poly(vinylcyclopentadiene). Polymers having a weight average molecular weight up to 1,000,000 or more can be used. It is preferable that 5 to 50 percent of the coordinating groups present in the polymer be complexed with the metal.

Each ligand can be substituted by groups that do not interfere with the complexing of the ligand with the metal atom. Examples of substituting groups, all of which preferably have less than 60 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbylfluoro compounds such as pentafluorophenyl and (perfluorooctyl)ethyl; hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

The transition metal-containing catalyst is preferably an organometallic complex. Examples of useful organometallic complex catalysts include [(cyclooctene)$_2$IrCl]$_2$, Mo(NBD)(CO)$_4$, Mo(CO)$_6$, W(CO)$_6$, (mesitylene)W(CO)$_3$, [(cyclooctene)P(isobutyl)$_2$(CH$_2$CH2C$_4$F$_9$)IrCl]$_2$, [(cyclooctene)P(C$_{12}$H$_{25}$)$_3$IrCl]$_2$, [(cyclooctene)P(isobutyl)(CH$_2$CH$_2$C$_4$F$_9$)$_2$IrCl]$_2$, and [(cyclooctene)P(isobutyl)$_2$(CH$_2$CH$_2$CH$_2$OC$_3$H$_{17}$)IrCl]$_2$. (The last four of the above catalysts can be prepared from the first-named catalyst by a simple displacement of a cyclooctene ligand with the appropriate phosphine ligand.) Use of a fluorine-containing moiety or a long chain hydrocarbon as part of the phosphine unit can aid in ensuring solubility in certain reaction fluids, such as, e.g., CO$_2$.

The transition metal-containing catalyst can be present in an amount that ranges from 0.0001 to 10% (by wt.) of the total polymerizable composition. The catalyst is preferably at least somewhat soluble in the reaction fluid.

Often, the use of a cocatalyst can enhance catalytic activity. Such a cocatalyst can be present in an amount that ranges from 0.1 to 1000 moles per mole of transition metal-containing compound. Common examples of potentially useful cocatalysts include alkylaluminum and alkyltin compounds such as $CH_3AlCl_2$, $(CH_3)_2AlCl$, $(CH_3)_3Al$, $(CH_3CH_2)_2AlCl$, $(CH_3CH_2CH_2CH_2)SnCl_3$, $(CH_3CH_2CH_2CH_2)_2SnCl_2$, $(CH_3CH_2CH_2CH_2)_3SnCl$, $(CH_3CH_2CH_2CH_2)_4Sn$, although those skilled in the art will recognize numerous other examples.

Any common solvent that is soluble in the reaction mixture can act as a co-solvent in the method of the present invention. Typical examples include tetrahydrofuran, alcohols, liquid alkanes, methylene chloride, chloroform, toluene, water, ketones, and esters. One or more co-solvents can be used to aid in the solubilization of one or more components in the reaction mixture.

Typical reaction temperatures range from −78° to 400° C., preferably 0° to 300° C., most preferably 150° to 150° C.

The olefin metathesis reaction procedure of the present invention is environmentally friendly (i.e., at most, minimal amounts of liquid solvents need be disposed of), easy, fast, and controllable (i.e., reaction rate can be controlled via dilution). Also, separation of reactants from products can be accomplished quickly where one or the other is soluble in the superatmospheric reaction medium.

Objects and advantages of this invention are further illustrated by the following examples. The particular materials and amounts thereof, as well as other conditions and details, recited in these examples should not be used to unduly limit this invention.

EXAMPLES

All reactions described below (other than the diblock copolymer synthesis from Example 1) were performed in a locally constructed 10 mL stainless steel view cell equipped with sapphire windows, a magnetic stirrer, and, optionally, an additional pressure handling system to add various materials under supercritical conditions. (Examples 16–18 were performed in a 110 mL stainless steel autoclave without a view cell, stirred by a rocking mechanism.) The cell was heated externally by either an electrical element or a coil containing circulating oil. The temperature was monitored by a thermocouple that was connected to a temperature controller or a temperature display unit.

Example 1: Preparation of Polymeric Dispersing Agents

A. Poly(FOA-b-IOA) diblock copolymer

To a glass flint bottle (which transmits UV radiation) were added 10.0 g IOA (prepared according to standard procedures), 1.2115 g benzyl N,N-diethyl(dithiocarbamate), and 10 mL ethyl acetate. Nitrogen was bubbled through the contents of the bottle for about 20 min. The bottle was sealed, placed on rollers, and rotated about 5 cm under a UV lamp for about 44 hours. The contents of the bottle were concentrated by evaporating approximately 6 g of ethyl acetate, and the concentrate was precipitated into methanol to give a viscous liquid. The methanol was decanted therefrom, and the viscous liquid was washed with methanol before being dried under vacuum and weighed (9.1156 g, 81.4% yield). The viscous liquid was poly(IOA) with dithiocarbamate at one of the two polymer chain ends.

Another glass flint bottle was charged with 4.27 g of the poly(IOA) from the preceding paragraph, 24.2507 g FOA (3M; St. Paul, Minn.), and 17 g Freon™ 113. Nitrogen was bubbled through the contents. The bottle was sealed and placed on rollers under a UV lamp. After about 15 hours of irradiation, 5 g of additional Freon™ 113 was added to the bottle. The bottle was purged with nitrogen, sealed, and again placed under the UV lamp. After a total of 43 hours of UV irradiation, the polymerization mixture was diluted with Freon™ 113 and precipitated into methanol. A clear-white, stringy polymer precipitated. The polymer (i.e., a poly (FOA)-poly(IOA) diblock copolymer) was washed with methanol, dried under vacuum, and weighed (26.7355 g, 93.7% yield).

B. Poly(FOA-co-IOA) random copolymer

A 10 mL view cell was charged with 2.7011 g FOA, 0.3069 g IOA, and 0.0124 g 2,2'-azobisisobutyronitrile (AIBN). Nitrogen was used to purge the cell before carbon dioxide was added thereto. The contents were heated to 62° C. and the pressure adjusted to about 34.7 MPa (5015 psig) by the addition of more carbon dioxide. The polymerizaton was allowed to proceed at or near these conditions for approximately 20 hours. The cell was then allowed to cool, and carbon dioxide was vented slowly therefrom. The contents of the cell were dissolved in Freon™ 113 and precipitated into methanol. A sticky polymer was collected, washed with methanol, and dried under vacuum. The weight average molecular weight ($M_w$) of the polymer, as determined by gel permeation chromatography (GPC), was 245,000.

C. Poly(FOA) homopolymer

A 10 mL view cell was charged with 3.03 g FOA and 0.0108 g AIBN. Nitrogen was used to purge the cell before $CO_2$ was added thereto. The contents were heated to 60° C., and the pressure adjusted to about 34.6 MPa (5000 psig) by addition of more $CO_2$. The polymerization was run at or near these conditions for approximately 20 hours. The cell was allowed to cool, and $CO_2$ was vented slowly from the view cell. The contents of the cell were dissolved in Freon™ 113 and precipitated into methanol. A sticky polymer was collected, washed with methanol, dried under vacuum, and weighed (36.1% yield). The $M_w$ of the polymer as determined by GPC was 213,000.

Example 2: Copolymerization of IOA and Acrylic Acid (AA) in $CO_2$ in the Absence of a Dispersing Agent A 10 mL view cell was charged with 1.41 g IOA, 0.09 g AA, and 0.0150 g AIBN. Nitrogen was used to purge the cell before $CO_2$ was added thereto. The contents were heated to 66° C. and the pressure adjusted to about 35.2 MPa (5090 psig) by the addition of more $CO_2$. The contents formed a clear, colorless, homogeneous solution.

The polymerization was run at or near these conditions, and the visual appearance of the polymerization was checked periodically. (The following time periods are referenced from the point at which the contents reached the aforementioned polymerization conditions.) After approximately 3 hours, the contents were still a clear, colorless, homogeneous solution. After approximately 5 hours, a fine white particle morphology (i.e., the copolymer) had begun to form in the $CO_2$-rich continuous phase. After approximately 6 hours, the particles had agglomerated to form a film on the sapphire window of the view cell. After 23 hours, the copolymer had agglomerated and settled to the bottom of the view cell. The system consisted of a polymer-rich phase at the bottom of the view cell and a $CO_2$-rich phase above the polymer-rich phase. The yield was 84.6%, and the $M_w$ of the polymer was 104,000.

This experiment shows that an IOA-AA system does not yield a dispersed polymer in $CO_2$ in the absence of a dispersing agent.

Example 3: Copolymerization of IOA and AA in the Presence of Diblock Copolymer Dispersing Agent The same ingredients as used in Example 2 were added to the 10 mL view cell except that 0.1500 g of the diblock copolymer from Example 1 was also added. Nitrogen was used to purge the cell before $CO_2$ was added thereto. The contents of the cell were heated to 66° C., and the pressure adjusted to about 35.2 MPa (5095 psig) by the addition of more $CO_2$. The contents formed a clear, gold-colored homogeneous solution.

The polymerization was run at or near these conditions, and the visual appearance of the polymerization mixture was periodically checked. (The folowing time periods are referenced from the point at which the contents reached polymerization conditions.) After approximately 4½ hours, the contents appeared slightly cloudy. After approximately 7½ hours, the IOA-AA copolymer had phase separated from the $CO_2$-rich continuous phase. The copolymer was dispersed as fine, white particles uniformly distributed throughout the $CO_2$-rich continuous phase. After 23 hours, the copolymer remained uniformly dispersed as fine, white particles in the $CO_2$-rich continuous phase.

The cell had an outlet connected to a 0.0625 inch, high pressure tubing with an in-line needle valve. By cracking open the valve, the copolymer was sprayed into a container. The valve was closed when the pressure inside the cell dropped to about 20.8 MPa (3000 psig). The fine, white particles began to settle slightly toward the bottom of the cell. Upon repressurizing the cell to about 34.6 MPa (5000 psig) with $CO_2$, the particles redispersed uniformly throughout the cell. Yield was 83.4%, and the $M_w$ of the polymer was 131,000.

Example 4: Copolymerization of IOA and AA in the Presence of a Random Copolymer Dispersing Agent The same ingredients as used in Example 2 were added to the 10 mL view cell except that 0.1503 g of the random copolymer from Example 1 was also added. Nitrogen was used to purge the cell before $CO_2$ was added thereto. The contents were heated to 66° C., and the pressure adjusted to 34.9 MPa (5050 psig) by the addition of more $CO_2$. The contents formed a clear, colorless, homogeneous solution. The polymerization was run at or near these conditions.

The visual appearance of the polymerization was periodically checked. (The folowing time periods are referenced from the point at which the contents reached polymerization conditions.) After approximately 1½ hours, the contents were still clear, colorless, and homogeneous. After approximately 5½ hours, the IOA-AA copolymer had phase separated from the $CO_2$-rich continuous phase. The copolymer was dispersed as fine, white particles uniformly distributed throughout the $CO_2$-rich continuous phase. After 24 hours, the copolymer remained uniformly dispersed as fine, white particles in the $CO_2$-rich continuous phase. The contents of the cell were sprayed as in Example 3 with a similar result. Yield was 82.0%, and the $M_w$ of the polymer was 152,000.

Example 5: Copolymerization of IOA and AA in the Presence of a Poly(FOA) Dispersing Agent The same ingredients as used in Example 2 were added to the 10 mL view cell except that 0.0469 g poly(FOA) from Example 1 was also added. Nitrogen was used to purge the cell before $CO_2$ was added thereto. The contents were heated to 65° C., and the pressure adjusted to about 33.5 MPa (4850 psig) by the addition of more $CO_2$. The contents formed a clear, colorless, homogeneous solution. The polymerization was run at or near these conditions.

The visual appearance of the mixture was periodically checked. (The folowing time periods are referenced from the point at which the contents reached polymerization conditions.) After approximately 2 hours, the mixture still was clear, colorless, and homogeneous. After approximately 8 hours, the IOA-AA copolymer had phase separated from the $CO_2$-rich continuous phase. The copolymer was dispersed as fine, white particles uniformly distributed throughout the $CO_2$-rich continuous phase. After 20½ hours, the copolymer remained uniformly dispersed in the $CO_2$-rich continuous phase as fine, white particles.

An attempt to spray the contents of the cell as in Example 3 was made; however, spraying was not as effective as before. During the spraying process, the dispersion became unstable, particles aggregated, and a polymer film began to develop on the sapphire window. (It is believed that poly (FOA) was preferentially removed from the cell during the spraying operation. This may be advantageous for applications where polymeric particles without surfactant or dispersing agent on their surface are desired.) Yield was 84.5%, and the $M_w$ of the polymer was 127,000.

Example 6: Copolymerization of IOA and AA in the Presence of a Fluorinated Poly(tetramethylene oxide) Dispersing Agent To a 10 mL, high pressure reactor cell was added 1.41 g IOA, 0.09 g AA, 0.0150 g AIBN, and 0.15 g fluorinated poly(tetramethylene oxide). The cell was purged with nitrogen for about 5 minutes. It was then pressurized to 17.3 MPa (2500 psig) with $CO_2$, and its temperature was raised to 65° C. The cell pressure was then raised to about 34.6 MPa (5000 psig) by the addition of more $CO_2$. After about 2½ hours at these conditions, the entire cell seemed to be filled with a milky white dispersion. This dispersion was maintained for more than 3 hours. The reaction was cooled and vented to release the pressure. Solid polymer was removed and dried at low heat in a vacuum oven. Yield was 64%, and the $M_w$ of the polymer was 372,000.

Example 7: Copolymerization of IOA and AA in the Presence of a Diblock Copolymer Dispersing Agent and Photoinitiator A reaction cell, located about 5 cm from two Sylvania™ 15-watt BL-type black light fluorescent bulbs, was charged with 1.5 g of a 94:6 mixture of IOA and AA, 0.15 g of the diblock copolymer from Example 1, and 0.015 g Esacure™ KB-1 photoinitiator (Ciba-Geigy Corp.; Ardsley, N.Y.). As the cell was brought to 65° C. and 34.6 MPa (5000 psig) by pressurizing with $CO_2$, the contents were clear and colorless. Photolysis was then initiated. About 2 hours thereafter, the contents appeared to be a cloudy white dispersion. The contents were allowed to stir for about 21 hours under irradiation, with the dispersed phase becoming increasingly opaque and a thin clear layer separating from the upper dispersed phase. Increased agitation of the cell resulted in one essentially dispersed phase, however. Allowing the pressure to fall below about 17 MPa (2500 psig) resulted in a phase separation (i.e., a less dense, nearly clear phase above a cloudy white dispersed phase). Raising the pressure above about 22 MPa (3300 psig) again produced a single, cloudy dispersed phase.

Approximately 1.25 g of material was recovered. The $M_w$ of the polymer was 104,000.

Example 8: Polymerimzation of n-Butyl Methacrylate in $CO_2$ in the Absence of a Dispersing Agent To a 10 mL reaction cell was added 1.50 g n-butyl methacrylate and 0.0150 g AIBN. The cell was purged with nitrogen, and $CO_2$ was thereafter added thereto. The cell contents were heated to 66° C. and the cell pressure was adjusted to 35.4 MPa (5125 psig) by the addition of additional $CO_2$. The contents formed a clear, colorless homogeneous solution. The polymeriztion was allowed to continue at or near the above-described reaction conditions. After 5 hours, poly(butyl methacrylate) had phase separated from the solution (as a transparent, tan-colored viscous fluid) and settled to the bottom of the cell. After 16 hours, the volume of the viscous fluid had increased slightly. Spraying of the contents of the cell as in Example 3 was attempted; however, only a liquid (which was predominantly monomer) was removed from the cell. Yield was 67%, and the $M_w$ of the polymer was 24,600.

This experiment shows that n-butyl methacrylate does not yield a dispersed polymer in $CO_2$ in the absence of a dispersing agent.

Example 9: Polymerization of n-Butyl Methacrylate in $CO_2$ in the Presence of a Poly(FOA) Dispersing Agent The same ingredients as in Example 8 were added to a reaction cell except that 0.1500 g poly(FOA) from Example 1 was also added. The cell was purged with nitrogen before carbon dioxide was added. The contents were heated to 66° C., and the pressure adjusted to 34.9 MPa (5060 psig) by the addition of more $CO_2$. The contents formed a clear, colorless homogeneous solution. The polymerization was run at or near the above reaction conditions.

The visual appearance of the polymerization was periodically checked. (The following time periods are referenced from the point at which the contents reached reaction conditions.) After 4 hours, poly(butyl methacrylate) had phase separated from the $CO_2$-rich continuous phase. The poly(butyl methacrylate) was dispersed as fine, off-white particles uniformly distributed throughout the $CO_2$-rich continuous phase. After approximately 7 hours, the poly(butyl methacrylate) remained uniformly dispersed as fine, off-white particles in the $CO_2$-rich continuous phase. Spraying of the contents of the cell as in Example 3 was attempted; however, mostly liquid (i.e., predominantly monomer) was removed from the cell. Yield was 37.9%, and the M. of the polymer was 21,000.

Example 10: Cationic Polymerization of Norbornadiene in the Presence of a Diblock Copolymer Dispersing Agent A cell was charged with 0.15 g of the diblock copolymer from Example 1, and 0.2 mL $BF_3OEt_2$ initiator, which is soluble at more than 10 weight percent in $CO_2$ at 40° C. and 34.6 MPa (5000 psig). The cell was brought to 40° C. and a pressure of 34.6 MPa (5000 psig) by addition of $CO_2$. The reaction had a cloudy light brown appearance. About 1.66 g norbornadiene (NBD) was injected into the cell. The contents of the cell appeared opaque and maroon colored with a "sandy" look. The reaction was then allowed to stir for 22 hours. Thereafter, the pressure was dropped below 13.2 MPa (1900 psig) which caused the dispersed maroon particles to precipitate. Subsequently, the pressure was raised above 17.3 MPa (2500 psig), and the material redispersed. Yield was 1.20 g.

Example 11: Ring Opening Metathesis Polymerization (ROMP) of Norbornene in the Presence of a Diblock Copolymer Dispersing Agent The cell was charged with 1.5 g norbornene (NBE), 0.15 g of the diblock copolymer from Example 1, and 0.015 g $Mo(NBD)(CO)_4$ catalyst. The cell was quickly brought to 40° C. and a pressure of 34.6 MPa (5000 psig) by pressurizing with $CO_2$. The light brown color of the contents of the cell indicated that at least some of the catalyst was soluble. (Some of the catalyst was not soluble, possibly due to its decomposition in storage.) After several hours the reaction product was well dispersed. The insoluble portion of the catalyst was still visible. After 22 hours, the pressure was dropped to 8.4 MPa (1200 psig) at which point the top quarter of the cell was colorless and optically transparent. The more dense bottom portion of the cell was opaque off-white or light brown and had off-white particles visibly suspended. Raising the pressure to 16.6 MPa (2400 psig) returned the cell to its original dispersed appearance. Lowering the pressure to 9.1 MPa (1300 psig) led to the entire cell appearing as the cell did in the more dense layer at 8.4 MPa (1200 psig). Yield was 0.30 g.

Example 12: Copolymerization of IOA and AA in the Presence of FOA as Internal Dispersing Agent A. High FOA Concentration and Cell Loading A cell was charged with a 94:6 mixture of 1.0 g IOA and AA, 1.0 g FOA internal dispersant, and 0.020 g AIBN initiator. The reactor was brought to 65° C. and pressure 34.6 MPa (5000 psig) by pressurizing with $CO_2$. The contents of the reactor initially appeared clear and colorless. After two hours, the reaction appeared translucent and cloudy white. The reaction was allowed to stir for 22 hours at which time the reaction was very cloudy with just a trace amount of white precipitate starting to form. As soon as the pressure was dropped somewhat, a white precipitate began to fall out of solution. When the pressure was reduced to 20.8 MPa (3000 psig), a fine white precipitate settled to the bottom of the cell, with a cloudy dispersed phase above it. Raising the pressure to 34.6 MPa (5000 psig) again yielded a cloudy dispersed phase. Reducing the pressure to 10.4 MPa (1500 psig) yielded the fine white precipitate as seen before, but the fluid above the precipitate at this pressure was optically clear and colorless rather than the cloudy white dispersion as seen at 20.8 MPa (3000 psig). The amount of material collected was 1.25 g. The $M_w$ of the polymer was 496,000.

B. Low FOA Concentration and Cell Loading

The cell was charged with 1.13 g of a 94:6 mixture of IOA and AA, 0.38 g FOA internal dispersant, and 0.015 g AIBN initiator. The cell was brought to 65° C. and a pressure of 34.6 MPa (5000 psig) by pressurizing with $CO_2$. The contents of the reactor initially appeared clear and colorless. After three hours, the contents remained clear and colorless. The reaction was allowed to stir for 22 hours at which time the reaction was translucent and cloudy white with a small amount of white precipitate. A slight reduction of the pressure resulted in the instantaneous formation of a white precipitate that began to fall out of solution and streak the window. Reducing the pressure to 20.8 MPa (3000 psig) resulted in a fine white precipitate settling to the bottom, white streaks on the sapphire windows of the cell, and a cloudy dispersed phase above the precipitate. Upon remaining at this pressure for a few minutes, the white streaks on the windows became clear. Further reducing the pressure to 10.4 MPa (1500 psig) caused the precipitate to appear to agglomerate, the window remained streaked but colorless, and the fluid phase was clear and colorless. Raising the pressure to 34.6 MPa (5000 psig) initially did not change the appearance of the cell contents, but after stirring 15 minutes some of the polymer was redispersed (i.e., the cell appeared cloudy). After 30 minutes of stirring at this pressure, most of the polymer was apparently redispersed, but it did not match the original level of dispersion prior to lowering the pressure. The amount of material collected was 0.55 g.

Example 13: Polymerization of Octadecylmethacrylate (ODMA) in the Presence of MeFOSEA as Internal Dispersing Agent A. High Monomer Concentration at 70° C.

To a 10 mL reaction cell were added 1.95 g MeFOSEA (3M), 1.05 g ODMA, and 0.0103 g AIBN. The cell was purged with nitrogen for 10 minutes. The cell was then filled with $CO_2$ to 13.2 MPa (1900 psig), and the temperature was raised to 70° C. The pressure was adjusted to about 35.3 MPa (5100 psig) by adding more $CO_2$. The reaction mixture was clear and homogeneous for more than 5 hours. After 11 hours at these conditions, the cell contents were black and opaque. The cell was cooled and polymer recovered (13% yield). The $M_w$ was 46,000.

B. Low Monomer Concentration at 60° C.

The cell was charged with 0.7 g ODMA, 1.3 g MeFOSEA, 25 mg AIBN, and 0.2 mL tetrahydrofuiran. The cell was brought to a temperature of 60° C. and pressure of 34.6 MPa (5000 psig), at which time a clear, homogeneous reaction mixture was observed. After 21 hours, the system was totally dark and inhomogeneous, with the lower eighth of the cell being white and the upper seven eighths being dark. On cooling and slow vesting, a polymeric product was obtained by dissolving the material from the cell in Freon™ 113 and precipitation in methanol. The polymer was collected by filtration and dried under vacuum (81% yield). Analysis by NMR showed the composition of the polymer to be 67:33 (w/w) MeFOSEA:ODMA. Weight average molecular weight of the polymer was 56,000.

Example 14: Copolymerization of MMA and IOA in the Presence of a Silicone Monomer as Internal Dispersing Agent To a 10 mL reaction cell was added 1.06 g 3-methacryloxypropyltris-(trimethylsiloxy)silane (Silar Laboratories, Inc.), 0.78 g methyl methacrylate, 0.16 g IOA, and 0.010 g di(4-t-butyl cyclohexyl)peroxydicarbonate (Akzo Chemical Co.; Dobbs Ferry, N.Y.). The cell was purged with nitrogen for about 10 minutes. The cell was filled with $CO_2$ and heated to 60° C. The cell was pressurized with additional $CO_2$ to about 34.6 MPa (5010 psig). The initial reaction mixture was clear and homogeneous. After 17 hours, the system was black and opaque. The reaction mixture was subsequently cooled and vented to ambient conditions. The recovered yield was 42 weight percent based on the weight of the charged monomers.

Example 15: Copolymerization of IOA and AA in the Presence of a Silicone Macromer Dispersing Agent To a 10 mnL reaction cell was added 1.41 g IOA, 0.09 g AA, 0.0150 g AIBN, and 0.60 g methacryloxypropyl-terminated polydimethylsiloxane (3M) as dispersing agent. The cell was purged with nitrogen for 5 minutes. The cell was then filled with $CO_2$ to 17.3 MPa (2500 psig), and the temperature was raised to 65° C. The pressure was adjusted to about 34.6 MPa (5000 psig) by addition of more $CO_2$. The initial reaction mixture was optically clear. After about 1½ hours at these conditions, the entire cell was filled with a milky white dispersion. After approximately 2½ hours, polymer began to agglomerate and settle to the bottom of the cell. The cell was cooled and vented to release the pressure. The solid polymer was removed and dried in a vacuum oven at low heat. Yield was 40%. Weight average molecular weight was 262,000.

Example 16: Metathesis Polymerization of NBE

To a 10 mL reaction cell were added 4.0 g norbornene (NBE), 0.10 g $Mo(NBD)(CO)_4$ catalyst, and three stainless steel balls for agitation. After purging with nitrogen, the cell was pressurized with $CO_2$ to 41.3 MPa (6000 psig) and heated to 50° C.

After 15 hours of agitation, the contents of the reactor were vented into a dry ice trap. Trace quantities of polymer, having proton NMR signals at δ=5.2–5.4 ppm, was detected, although the majority of the recovered material was unreacted monomer.

Example 17: Metathesis Polymerization of NBE

The polymerization of Example 16 was carried out using 4.49 g NBE and 0.105 g $W(=C=CHPh)(CO)_5$ catalyst, prepared according to Landon et al., *J Am. Chem. Soc.*, 107, p. 6739–40 (1985).

After agitation at 50° C. under 30.3 MPa (4400 psig) $CO_2$ pressure, 3.0 g of product were obtained. GPC analysis showed a bimodal molecular weight distribution, as shown in Table 1.

TABLE 1

| Fraction | $M_w$ | $M_n$ | $M_w/M_n$ | % of total |
|---|---|---|---|---|
| High | $8.48 \times 10^6$ | $7.46 \times 10^6$ | 1.14 | 8 |
| Low | $7.01 \times 10^6$ | $2.51 \times 10^5$ | 2.8 | 92 |

Example 18: Effect of Pressure on Metathesis Polymerization of NBE

The polymerization of Example 16 was carried out using 4.0 g NBE and 0.10 g $[Ir(cyclooctene)_2Cl]_2$ catalyst (Aldrich) at 50° C. under, respectively, 27.6 MPa (4000 psig) and 68.9 MPa (10,000 psig) $CO_2$ pressure. The molecular weight distribution of the resultant polymer is shown in Table 2.

TABLE 2

| Pressure (MPa) | $M_2$ | $M_n$ | $M_w/M_n$ |
|---|---|---|---|
| 27.6 | $4.55 \times 10^5$ | $1.45 \times 10^4$ | 31.3 |
| 68.9 | $1.68 \times 10^5$ | $5.67 \times 10^3$ | 29.6 |

Example 19: Metathesis Polymerization of NBE and Depolymerization with Ethylene An NBE polymer was prepared as described in Example 16 using 2.0 g NBE and 10 mg $[Ir(cyclooctene)2Cl]_2$ catalyst at 50° C. under 34.4 MPa (5000 psig) $CO_2$ pressure. Within the first 30 minutes of reaction, a visible yellow precipitate was observable in the originally clear solution. After 18 hours the cell was vented and a small aliquot of the solid polymer was obtained and its $M_w$ was found to be $1.80 \times 10^5$ (GPC).

The remaining yellow solid polymer was treated with an additional 10 mg catalyst and the cell was sealed and pressurized to 31 MPa (4500 psig) with $C_2H_4$. After 24 hours of stirring at 50° C., no visible change could be seen in the solid polymer. However, GPC analysis of the solid showed a $M_w$ of $8.08 \times 10^4$, indicating that some depolymerization had occurred.

Example 20: Metathesis Polymerization of NBE in Ethane

An NBE polymer was prepared as described in Example 16 using 1.1 g NBE and 10 mg |Ir(cyclooctene)$_2$Cl|$_2$ catalyst under 11.7 MPa (1700 psig) ethane pressure at 45° C. Within 10 minutes, white polymer was seen in the cell. After 88 hours of heating and stirring at pressure, the cell was vented to obtain a polymer of $M_w=4.05 \times 10^4$ and $M_n=4.02 \times 10^3$ ($M_w/M_n=10.1$).

Example 21: Ring-Closing Metathesis Reaction

A 10 mL reaction cell was charged with 0.5 g N,N-diallyl trifluoroacetamide (prepared by standard procedures of sequential N-alkylation of trifluoroacetamide with allyl chloride) and 0.04 g |Ir(cyclooctene)$_2$Cl|$_2$ catalyst under 20.7 MPa (1700 psig) $CO_2$ pressure at 40° C.

After stirring for 18 hours, the cell was vented and approximately 0.5 g of product was obtained. Gas chromatography showed the material to be the desired N-trifluoroacetylpyrroline in approximately 8% yield.

Various modifications and alterations which do not depart from the scope and spirit of this invention will become apparent to those skilled in the art. This invention is not to be unduly limited to the illustrative embodiments set forth therein.

We claim:

1. A process of making a polymer, comprising the steps:
   a) providing a polymerizing system comprising
      1) a homogeneous reaction mixture comprising
         (A) at least one fluid, said fluid being a gas at standard temperature and pressure, held at a pressure greater than atmospheric pressure such that said fluid is a liquid or a supercritical fluid, said fluid being carbon dioxide, a hydrofluorocarbon a perfluorocarbon or a mixture of any of the foregoing,
         (B) at least one monomer that polymerizes by chain polymerization, and
         (C) an effective amount of at least one of a polymerization initiator and catalyst; and
      2) a dispersing agent for a polymer formed from said at least one monomer; and
   b) allowing said at least one monomer to polymerize to form said polymer, said polymer being insoluble in said reaction mixture, wherein said dispersing agent allows a kinetically stable dispersion of said polymer to be formed in said polymerizing system.

2. The process of claim 1 wherein said fluid is carbon dioxide.

3. The process of claim 1 wherein said fluid is a $C_1$ to $C_5$ hydrofluorocarbon.

4. The process of claim 3 wherein said hydrofluorocarbon is selected from the group consisting of trifluoromethane, 1, 1,2,2-tetrafluoroethane, 1,1,1,2-tetrafluoroethane, and 1,1,1, 2,3,3,3-heptafluoropropane.

5. The process of claim 1 wherein said at least one monomer is a free radically-polymerizable ethylenically-unsaturated monomer.

6. The process of claim 5 wherein said free radically-polymerizable ethylenicaily-unsaturated monomer is selected from the group consisting of (meth)acrylic acid, alkyl (meth)acrylates, hydroxyalkyl (meth)acrylates, poly (meth)acrylates, macromeric (meth)acrylates, and nitrogen derivatives of (meth)acrylates.

7. The process of claim 5 wherein said free radically-polymerizable ethylenicaily-unsaturated monomer is selected from the group consisting of methyl-substituted maleonitrile, N-vinyl lactams, vinyl esters of carboxylic acid, vinyl and vinylidene halides, vinyl ethers, halogenated vinyl ethers, cyclic ethylenically-unsaturated carboxylic acid anhydrides, and substituted and unsubstituted styrenes.

8. The process of claim 1 wherein said at least one monomer polymerizes cationically.

9. The process of claim 8 wherein said cationically polymerizable monomer is selected from the group consisting of aromatic alkenes, conjugated and unconjugated polyenes, 1,1-dialkyl substituted alkenes, vinyl ethers and sulfides, N-vinylamines, and heterocyclic compounds.

10. The process of claim 1 wherein said at least one monomer is a ring-strained non-conjugated cyclic olefin.

11. The process of claim 1 wherein said at least one monomer polymerizes anionically.

12. The process of claim 11 wherein said at least one anionically polymerizing monomer is selected from the group consisting of epoxies, cyclic amides, isoprene, styrene, vinyl toluene, butadiene, halogenated dienes, (meth)acrylates, and hexamethylcyclo(trisiloxane).

13. The process of claim 1 wherein said at least one monomer undergoes coordination polymerization.

14. The process of claim 13 wherein said monomer is an α-olefin.

15. The process of claim 1 wherein said dispersing agent is added to said polymerizing system after said at least one monomer has begun to polymerize.

16. The process of claim 1 wherein said dispersing agent is non-polymerizable with said at least one monomer.

17. The process of claim 16 wherein said non-polymerizable dispersing agent is selected from the group selected from fluoropolymers, fluorinated ether compositions, polysiloxanes, block copolymers wherein at least one block is a fluoropolymer or a silicone polymer, random copolymers of at least one fluoromonomer or silicone monomer, silicone- or fluorine-containg graft copolymers.

18. The process of claim 1 wherein said dispersing agent is polymerizable with said at least one monomer.

19. The process of claim 18 wherein said polymerizable dispersing agent is selected from the group consisting of fluoromonomers, fluoromacromers, silicone monomers, and silicone macromers.

20. The process of claim 1 wherein said homogeneous reaction mixture further comprises a co-solvent.

21. A kinetically stable dispersion comprising at least one fluid, said fluid being a gas at standard temperature and pressure, held at a pressure greater than atmospheric pressure such that said fluid is a liquid or a supercritical fluid; a polymer; and a dispersing agent for said polymer, said dispersion being prepared according to a process comprising the steps:
   a) providing a polymerizing system comprising
      1) a homogeneous reaction mixture comprising
         (A) at least one fluid, said fluid being a gas at standard temperature and pressure, held at a pressure greater than atmospheric pressure such that said fluid is a liquid or a supercritical fluid, said fluid being carbon dioxide. a hydrofluorocarbon a perfluorocarbon. or a mixture of any of the foregoing (B) at least one monomer that polymerizes by chain polymerization. and (C) an effective amount of at least one of a polymerization initiator and catalyst: and 2) a dispersing agent for a polymer formed from said at least one monomer; and b) allowing said at least one monomer to polymerize to form said polymer. said polymer being insoluble in said reaction mixture. wherein said dispersing agent allows a kinetically stable dispersion of said polymer to be formed in said polymerizing system.

22. The dispersion of claim 21 wherein said fluid is carbon dioxide.

* * * * *

UNITED STATES PATENT AND TRADEMARK OFFICE
CERTIFICATE OF CORRECTION

PATENT NO.: 5,780,565            Page 1 of 3

DATED: July 14, 1998

INVENTOR(S): Robert S. Clough, Cheryl L. Senger Elsbernd and John E. Gozum

It is certified that error appears in the above-identified patent and that said Letters Patent is hereby corrected as shown below:

Title page , "Supersatmospheric Reaction" should read --Superatmospheric Reaction--.

Inventor cover page, "Cheryl L. Senger" should read --Cheryl L. Senger Elsbernd--.

Col. 2, line 52, "greater than one olefin" should read --greater than atmospheric pressure such that the fluid is a liquid or a supercritical fluid, at least one olefin--.

Col. 4, line 31, "thereof" should read --thereof.--.

Col. 5, line 38, "a-methyl" should read --α-methyl--.

Col. 6, line 8, "tetrahydrofuiran," should read --tetrahydrofuran,--.

Col. 6, line 13, "thereof" should read --thereof.--.

Col. 6, lineS 60-61, "norbomadiene" should read --norbornadiene--.

Col. 7, line 6, "5-norbomen-2-yl" should read --5-norbornen-2-yl--.

Col. 10, line 57, "dispersion-type polymerizations" should read --dispersion-type ring-opening metathesis polymerizations--.

Col. 10, line 58, "precipitation polymerizations" should read --precipitation ring-opening metathesis polymerizations--.

Col. 10, lines 59-60, "according to processes" should read --according to general polymerization processes--.

Col. 10, line 60, "known n the art)," should read --known in the art, as necessary),--.

UNITED STATES PATENT AND TRADEMARK OFFICE
CERTIFICATE OF CORRECTION

PATENT NO.: 5,780,565
DATED: July 14, 1998
INVENTOR(S): Robert S. Clough, Cheryl L. Senger Elsbernd and John E. Gozum It is certified that error appears in the above-identified patent and that said Letters Patent is hereby corrected as shown below:

Col. 10, line 65, "$\sim C=C\sim + R^7R^8C=CR^9R^{10} \rightarrow \sim C=CR^9R^{10} + \sim C=CR^7R^8$" omit second occurrence of equation.

Col. 12, line 54, "$(CH_2CH2C_4F_9)$" should read --$(CH_2CH_2C_4F_9)$--.

Col. 12, line 57, "$(CH_2CH_2CH_2OC_3H_{17})$" should read --$(CH_2CH_2CH_2OC_8H_{17})$--.

Col. 15, line 15, "folowing" should read --following--.

Col. 15, line 48, "folowing" should read --following--.

Col. 16, line 6, "folowing" should read --following--.

Col. 16, line 41, "a nd" should read --and--.

Col. 17, line 1, "Polymerimzation" should read --Polymerization--.

Col. 19, line 24, "tetrahydrofuiran." should read --tetrahydrofuran.--.

Col. 19, line 30, "vesting," should read --venting,--.

Col. 20, line 50, "$M_2$" should read --$M_w$--.

Col. 22, line 6, "ethylenicaily" should read --ethylenically--.

Col. 22, line 45, "contaiing" should read --containing--.

Col. 23, line 1, "hydrofluorocarbon" should read --hydrofluorocarbon,--.

UNITED STATES PATENT AND TRADEMARK OFFICE
CERTIFICATE OF CORRECTION

PATENT NO.: 5,780,565
DATED: July 14, 1998
INVENTOR(S): Robert S. Clough, Cheryl L. Senger Elsbernd and John E. Gozum It is certified that error appears in the above-identified patent and that said Letters Patent is hereby corrected as shown below:

Col. 23, lines 2-3, "foregoing" should read --foregoing,--.

Signed and Sealed this

Eighteenth Day of May, 1999

Attest:

Q. TODD DICKINSON

*Attesting Officer*  *Acting Commissioner of Patents and Trademarks*